US011584649B2

(12) United States Patent
Liu et al.

(10) Patent No.: US 11,584,649 B2
(45) Date of Patent: Feb. 21, 2023

(54) CARBON NANOTUBE COMPOSITE CATALYTIC FILM AND METHOD FOR MAKING THE SAME

(71) Applicants: Tsinghua University, Beijing (CN); HON HAI PRECISION INDUSTRY CO., LTD., New Taipei (TW)

(72) Inventors: Kai Liu, Beijing (CN); Chenyu Li, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 187 days.

(21) Appl. No.: 17/032,387

(22) Filed: Sep. 25, 2020

(65) Prior Publication Data

US 2022/0017368 A1 Jan. 20, 2022

(30) Foreign Application Priority Data

Jul. 17, 2020 (CN) .......................... 202010692093.4

(51) Int. Cl.
*C01B 32/168* (2017.01)
*B01J 23/755* (2006.01)
*C08J 5/18* (2006.01)

(52) U.S. Cl.
CPC .......... *C01B 32/168* (2017.08); *B01J 23/755* (2013.01); *C08J 5/18* (2013.01)

(58) Field of Classification Search
CPC .......... C01B 32/168; B01J 23/755; C08J 5/18
See application file for complete search history.

(56) References Cited

U.S. PATENT DOCUMENTS 8,246,861 B2 8/2012 Zhou et al.

FOREIGN PATENT DOCUMENTS

CN 102040213 5/2011

OTHER PUBLICATIONS

"Supplementary Information for A Lightly Fe-doped (NiS2/MoS2)/carbon nanotube hybrid electrocatalyst fiml with laser-drilled micropores for stabilized overall water splitting and pH-universal hydrogen evolution reaction" Li et al. (2020).*
Balancing Dielectric Loss and Magnetic Loss in Fe—NiS2/NiS/PVDF Composites toward Strong Microwave Reflection Loss.*
English machine translation of CN102040213B (2011).*
"A lightly Fe-doped (NiS2/MoS2)/carbon nanotube hybrid electrocatalyst film with laser-drilled micropores for stabilized overall water splitting and pH-universal hydrogen evolution reaction stabilized overall water splitting and pH-universal hydrogen evolution reaction", Chenyu Li et al., J. Mater. Chem. A, Jul. 22, 2020, 17527-17536.

\* cited by examiner

Primary Examiner — Richard M Rump
(74) Attorney, Agent, or Firm — ScienBiziP, P.C.

(57) ABSTRACT

A method for making a carbon nanotube composite catalytic film includes providing a carbon nanotube film and providing a precursor solution including iron nitrate, nickel chloride, and molybdenum pentachloride. The precursor solution is placed on the carbon nanotube film, to obtain a precursor film. The precursor film defines multiple through holes spaced apart from each other. The precursor film with the multiple through holes is annealed and a sulfur power is applied during annealing the precursor film with the multiple through holes.

10 Claims, 13 Drawing Sheets

CARBON NANOTUBE COMPOSITE CATALYTIC FILM AND METHOD FOR MAKING THE SAME

FIELD

The present application relates to a carbon nanotube composite catalytic film and a method for making the same.

BACKGROUND

Molecular hydrogen ($H_2$) is a sustainable energy source that can replace fossil fuels. The molecular hydrogen can be obtained by splitting water. In the process of splitting water, hydrogen evolution reaction (HER) occurs at the cathode and oxygen evolution reaction (OER) occurs at the anode. The electrocatalyst can reduce the overpotential in the electrochemical reaction, and promote the hydrogen evolution reaction and the oxygen evolution reaction. The electrocatalyst is usually noble metal, for example, Pt/C is usually used for hydrogen evolution reaction, and $IrO_2$ or $RuO_2$ is usually used for oxygen evolution reaction. However, these noble metals as electrocatalysts will be greatly restricted in application due to high cost and scarcity.

Therefore, there is room for improvement in the art.

BRIEF DESCRIPTION OF THE DRAWINGS

Implementations of the present technology will now be described, by way of embodiments, with reference to the attached figures, wherein.

DETAILED DESCRIPTION

Figure 1:
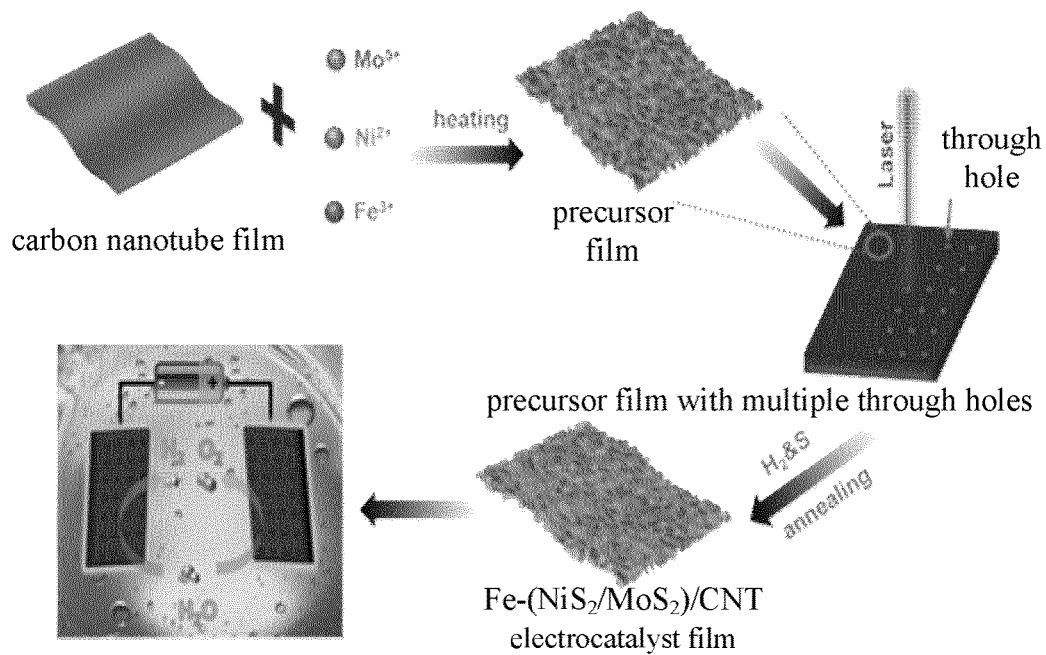
FIG. 1 shows a process flow of a method for making a carbon nanotube composite catalytic film.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to illustrate details and features better. The description is not to be considered as limiting the scope of the embodiments described herein.

Several definitions that apply throughout this disclosure will now be presented.

The term "substantially" is defined to be essentially conforming to the particular dimension, shape or another word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

FIG. 1 shows a method for making a carbon nanotube composite catalytic film, and the method includes one or more of the following steps:

S1, providing a carbon nanotube film; S2, providing a precursor solution including $Fe(NO_3)_3$ (iron nitrate), $NiCl_2$ (nickel chloride), and $MoCl_5$ (molybdenum pentachloride);

S3, placing the precursor solution on the carbon nanotube film and drying, to obtain a precursor film;

S4, making the precursor film define a plurality of through holes spaced apart from each other; and S5, annealing the precursor film with the plurality of through holes, and applying sulfur power during annealing the precursor film with the plurality of through holes, to obtain the carbon nanotube composite catalytic film.

During step S1, a method for making the carbon nanotube film includes one or more of the following sup-steps:

S11, providing carbon nanotubes;

S12, adding the carbon nanotubes into a solvent and flocculating, to obtain a carbon nanotube floccule structure; and S13, separating the carbon nanotube floccule structure from the solvent and drying, to obtain the carbon nanotube film.

During step S11, the carbon nanotubes can be from a carbon nanotube array prepared by various methods, such as chemical vapor deposition, graphite electrode constant current arc discharge deposition, or laser evaporation deposition. In one embodiment, the carbon nanotube array is a super-aligned carbon nanotube array (SACNT array) prepared by the chemical vapor deposition. The carbon nanotubes in the SACNT array are substantially parallel to each other and substantially perpendicular to a growth surface of the growth substrate. A blade or other tool is used to scrape the SACNT array from the growth substrate, to obtain the carbon nanotubes.

During step S12, the solvent can be selected from water or volatile organic solvent. After adding the carbon nanotubes to the solvent, a process of flocculating the carbon nanotubes can be executed to create the carbon nanotube floccule structure. The process of flocculating the carbon nanotubes can be ultrasonic dispersion of the carbon nanotubes or agitating the carbon nanotubes. In one embodiment, ultrasonic dispersion is used to flocculate the solvent containing the carbon nanotubes from about 10 minutes to about 30 minutes. Due to the carbon nanotubes in the solvent having a large specific surface area and the tangled carbon nanotubes having a large van der Waals force, the flocculated and tangled carbon nanotubes can form a network structure (e.g., floccule structure).

During step S13, the carbon nanotube floccule structure is separated from the solvent by filtering.

During step S2, $Fe(NO_3)_3$ (iron nitrate), $NiCl_2$ (nickel chloride), and $MoCl_5$ (molybdenum pentachloride) are added into the solvent, to obtain the precursor solution. Thus, the precursor solution consists of the $Fe(NO_3)_3$, $NiCl_2$, $MoCl_5$, and the solvent. The solvent can be selected according to need. In one embodiment, the solvent is ethanol. The molar ratio of $NiCl_2$ and $MoCl_5$ can be 1:1, 1:2, or 1:3. The molar ratio of $Fe(NO_3)_3$, $NiCl_2$, and $MoCl_5$ can be 1:1:2, 2:3:6, 1:3:6, 1:9:18, or 1:18:36. In one embodiment, the molar ratio of $Fe(NO_3)_3$, $NiCl_2$, and $MoCl_5$ is 1:18:36, and Fe:Ni:Mo (molar ratio)=1:18:36.

During step S3, the precursor solution is dropped onto the carbon nanotube film. In one embodiment, the carbon nanotube film is placed on a heating table, and then the precursor solution is dropped onto the carbon nanotube film. The precursor film consists of the carbon nanotube film, $Fe(NO_3)_3$, $NiCl_2$, and $MoCl_5$.

During step S4, the method for defining the plurality of through holes in the precursor film is not limited. In one embodiment, a laser is used for drilling the precursor film, the power of the laser is 18 W (watts), and the wavelength is 1.06 microns ($\lambda=1.06$ μm).

During step S5, annealing the precursor film with the plurality of through holes is performed in a protective gas, to prevent the carbon nanotubes from being carbonized during annealing. The purpose of applying sulfur power is to vulcanize. During annealing, the sulfur power reacts with $Fe(NO_3)_3$, $NiCl_2$, and $MoCl_5$ to obtain Fe-doped ($NiS_2$/$MoS_2$) composite. The Fe-doped ($NiS_2$/$MoS_2$) is represented by Fe—($NiS_2$/$MoS_2$). The Fe-doped ($NiS_2$/$MoS_2$) composite is attached or located on the carbon nanotube film, to form the carbon nanotube composite catalytic film. In FIG. 1, the carbon nanotube composite catalytic film is represented by Fe—($NiS_2$/$MoS_2$)/CNT electrocatalyst film. That is, the carbon nanotube composite catalytic film is an electrocatalyst film. The amount of sulfur power is sufficient. In one embodiment, the sulfur power is in a range from about 2 g (gram) to 4 g. The protective gas is not limited, and the annealing temperature varies according to the type of protective gas. In one embodiment, the protective gas is a mixture of 90% Ar and 10% $H_2$, the annealing temperature is about 400 degrees Celsius, a heating temperature corresponding to the sulfur source is about 190 degrees Celsius, and the amount of sulfur power is about 2 g.

The method for making the carbon nanotube composite catalytic film further includes a cleaning step. After annealing, it is washed sequentially with deionized water and ethanol, and dried. In one embodiment, after annealing, it is washed sequentially with deionized water and ethanol for 3 minutes.

Referring to FIGS. 2A-2B and FIGS. 3A-3F, the carbon nanotube composite catalytic film consists of carbon nanotube film and the Fe-doped ($NiS_2$/$MoS_2$) composites. The Fe-doped ($NiS_2$/$MoS_2$) composite consists of $NiS_2$, $MoS_2$, and Fe. The Fe-doped ($NiS_2$/$MoS_2$) composites are granular structures, and the granular structures are located on the surface and the micropores of the carbon nanotube film. The Fe-doped ($NiS_2$/$MoS_2$) composites are in direct contact with the outer surface of the carbon nanotubes.

Figure 4:
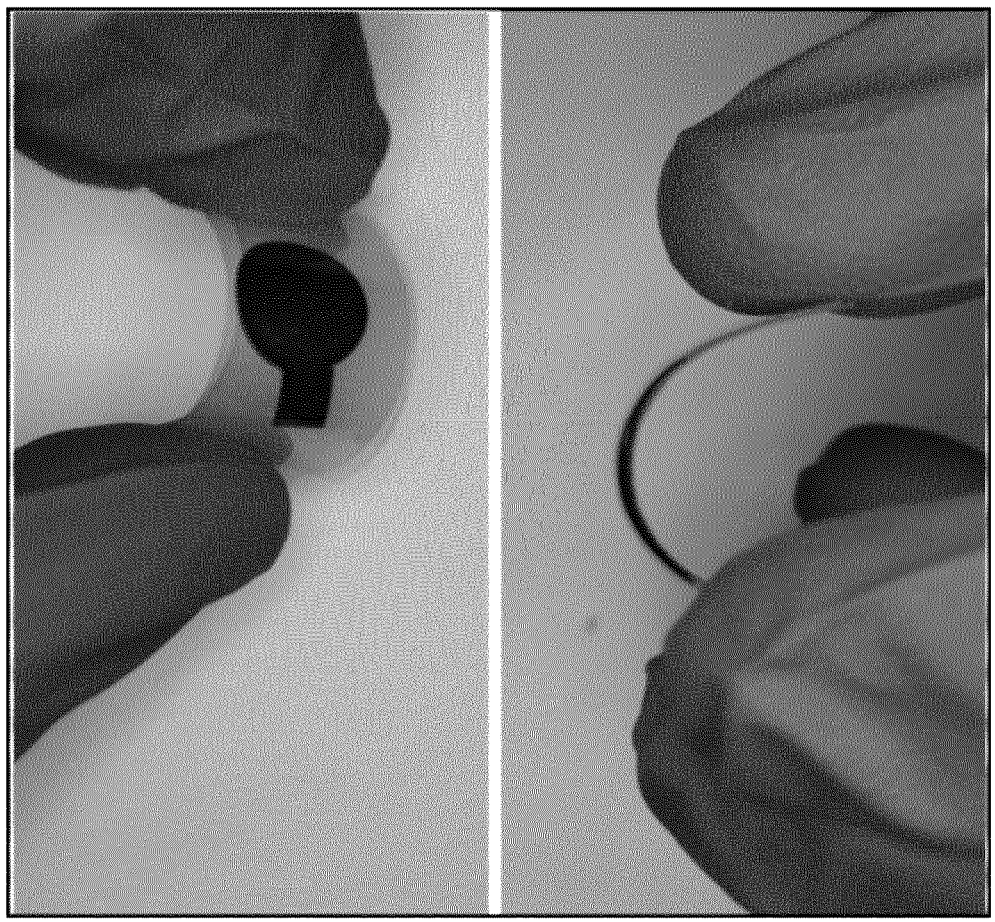
FIG. 4 shows an optical image of the carbon nanotube composite catalytic film.

The carbon nanotube film includes a plurality of long, curved, disordered carbon nanotubes entangled with each other. The carbon nanotube film can be isotropic. The carbon nanotubes can be substantially uniformly dispersed in the carbon nanotube film. Adjacent carbon nanotubes are acted upon by van der Waals attractive force to obtain an entangled structure. Due to the carbon nanotubes in the carbon nanotube film being entangled with each other, the carbon nanotube film has excellent flexibility and can be fashioned into desired shapes with a low risk to the integrity of the carbon nanotube film. Further, the carbon nanotube film is a free-standing film. The carbon nanotube composite catalytic film has excellent flexibility and is a free-standing film, as shown in FIG. 4.

The term "free-standing" includes, but is not limited to, the carbon nanotube composite catalytic film does not have to be supported by a substrate. For example, the free-standing carbon nanotube composite catalytic film can sustain the weight of itself when it is hoisted by a portion thereof without any significant damage to its structural integrity. So, if the free-standing carbon nanotube composite catalytic film is placed between two separate supporters, a portion of the free-standing carbon nanotube composite catalytic film, not in contact with the two supporters, would be suspended between the two supporters and yet maintain film structural integrity.

The micropores are formed between adjacent carbon nanotubes, so that the carbon nanotube film defines multiple micropores. In one embodiment, the Fe-doped ($NiS_2/MoS_2$) composites are located on the outer surface of each carbon nanotube and located in the micropores.

The carbon nanotube composite catalytic film defines a plurality of through holes spaced apart from each other. The plurality of through holes is periodically arranged. The plurality of through holes passes through the carbon nanotube composite catalytic film from the thickness direction of the carbon nanotube composite catalytic film. The diameter of each through hole ranges from about 30 microns to about 50 microns. The distance between adjacent through holes ranges from about 100 microns to about 1600 microns. In one embodiment, the diameter of each through hole is about 40 microns, and the distance between adjacent through holes is about 800 microns. The Fe-doped ($NiS_2/MoS_2$) composite consists of $NiS_2$, $MoS_2$, and Fe. The molar ratio of Fe, Ni, and Mo can be 1:1:2, 2:3:6, 1:3:6, 1:9:18, or 1:18:36. In one embodiment, the molar ratio of Fe, Ni, and Mo is 1:18:36, and Fe:Ni:Mo (molar ratio)=1:18:36.

The following are specific embodiments of the present application, which cannot limit the present application.

Preparation of the Carbon Nanotube Film

The carbon nanotubes are derived from a super-aligned carbon nanotube (SACNT) array, which is synthesized in a low-pressure chemical vapor deposition system. In the SACNT array, the carbon nanotubes are much denser and aligned much better than those in ordinary arrays and have a very clean surface and good electrical conductivity with few defects. To prepare the carbon nanotube film, 20 mg carbon nanotubes are removed out of the SACNT array into 250 ml ethanol and dispersed under high-power probe ultrasonication (SCIENTZ-950E) for 5 minutes. Then, the carbon nanotube film is fabricated by suction filtration from the above mixed solution. After the carbon nanotube film is sufficiently dried at 80° C. for 10 hours, small discs with a diameter of 10 mm are cut from it by a laser cutting machine (18 W) as the substrate.

Synthesis of the Precursor Film $Fe(NO_3)_3 \cdot 9H_2O$, $NiCl_2$ and $MoCl_5$ are added into 50 ml ethanol in different proportions and stirred for 3 days to get a fully dissolved precursor solution (molar ratios of Ni and Mo are 1:1, 1:2 and 1:3; and molar ratios of Fe and Ni are 1:18, 1:9, 1:3, 2:3 and 1:1, respectively). The carbon nanotube film is placed on a heating stage at a temperature of 70° C., and then the precursor solution is added on it dropwise until the load was about 60 mg. After dried for 1 hour, the precursor film is obtained.

Synthesis of the Carbon Nanotube Composite Catalytic Film

The precursor film is drilled by laser to form multiple through holes in the precursor film, the precursor film with through holes is then annealed in a 10% $H_2$ and 90% Ar atmosphere at 400° C. for 30 minutes. During annealing, a sufficient amount of sulfur powder is placed at the upper end of the airflow and its temperature is maintained at 190° C. The carbon nanotube composite catalytic film is washed with deionized water and ethanol orderly for 3 minutes and dried.

The laser ($\lambda$=1.06 μm) is set to 18 W in power, which drilled through holes on the precursor film. The obtained through holes have a spacing of 800 μm. The average diameter of the through hole is about 40 μm.

The following electrochemical tests of the carbon nanotube composite catalytic film are performed, wherein the molar ratio of Fe, Ni, and Mo is 1:18:36 in the carbon nanotube composite catalytic film. In the test diagrams, for simplicity and clarity, the carbon nanotube composite catalytic film (the molar ratio of Fe, Ni, and Mo is 1:18:36) is represented by Fe—($NiS_2/MoS_2$)/CNT.

Figure 2A:
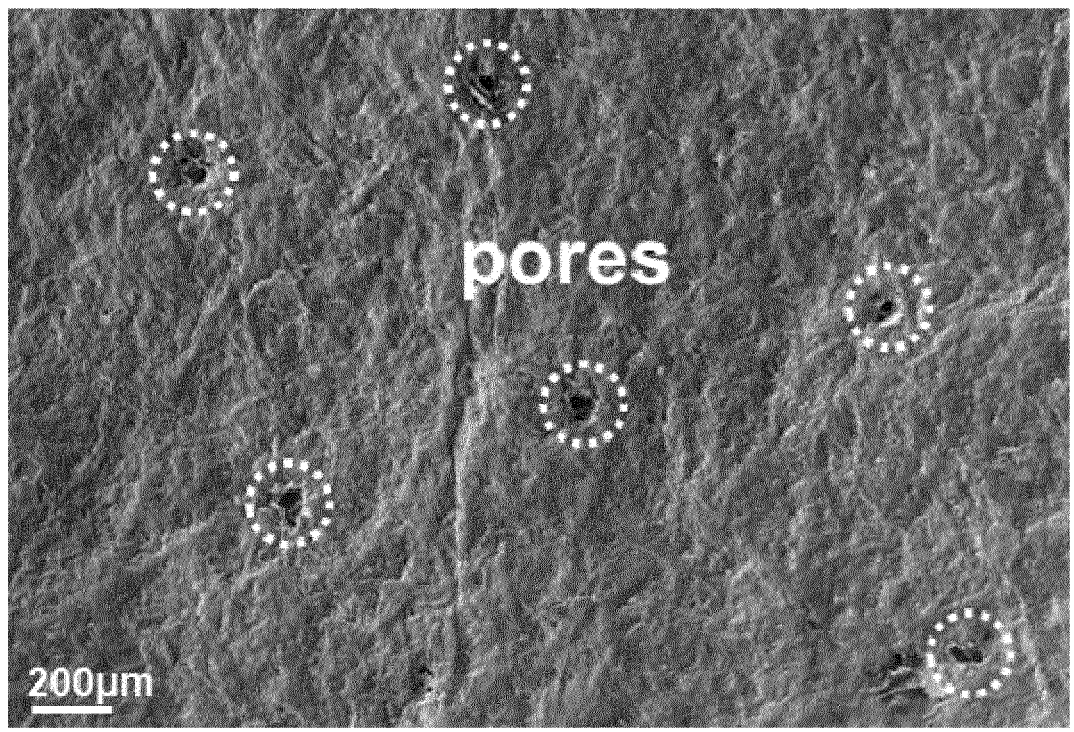
FIG. 2A shows a scanning electron microscope (SEM) image of the carbon nanotube composite catalytic film.
Figure 2B:
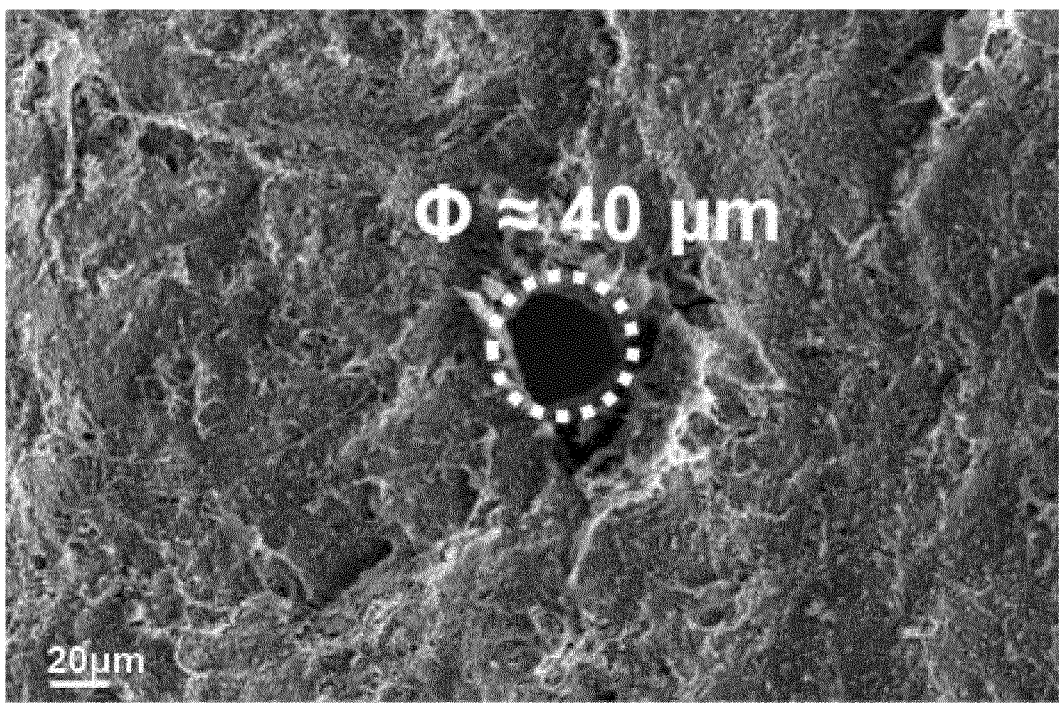
FIG. 2B shows another SEM image of the carbon nanotube composite catalytic film.
Figure 3A:
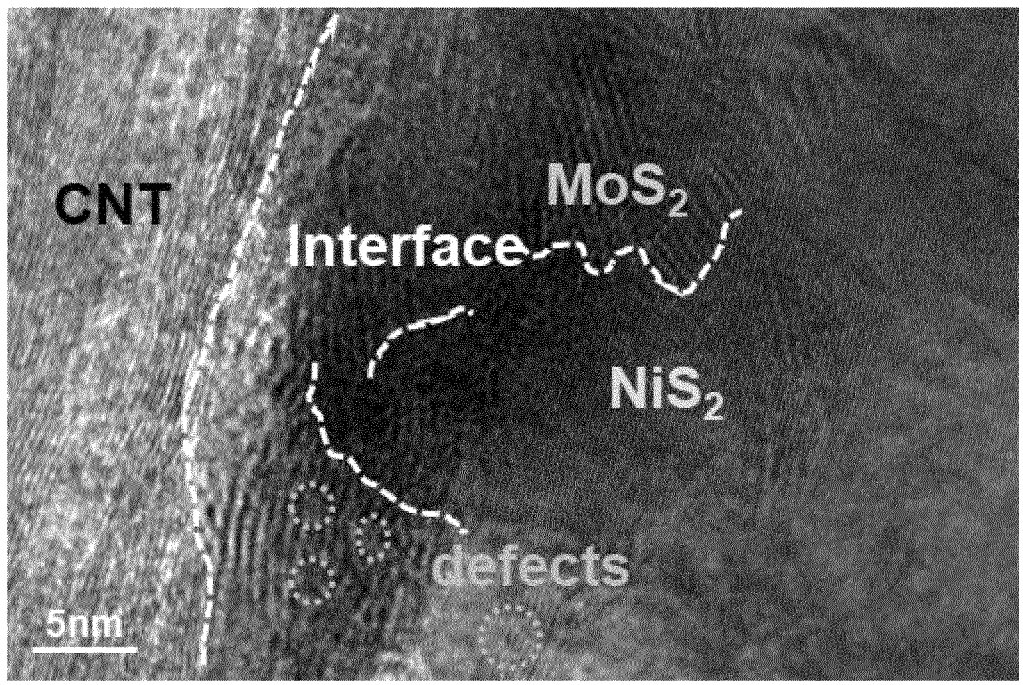
FIG. 3A shows a transmission electron microscope (TEM) image of the carbon nanotube composite catalytic film.
Figure 3B:
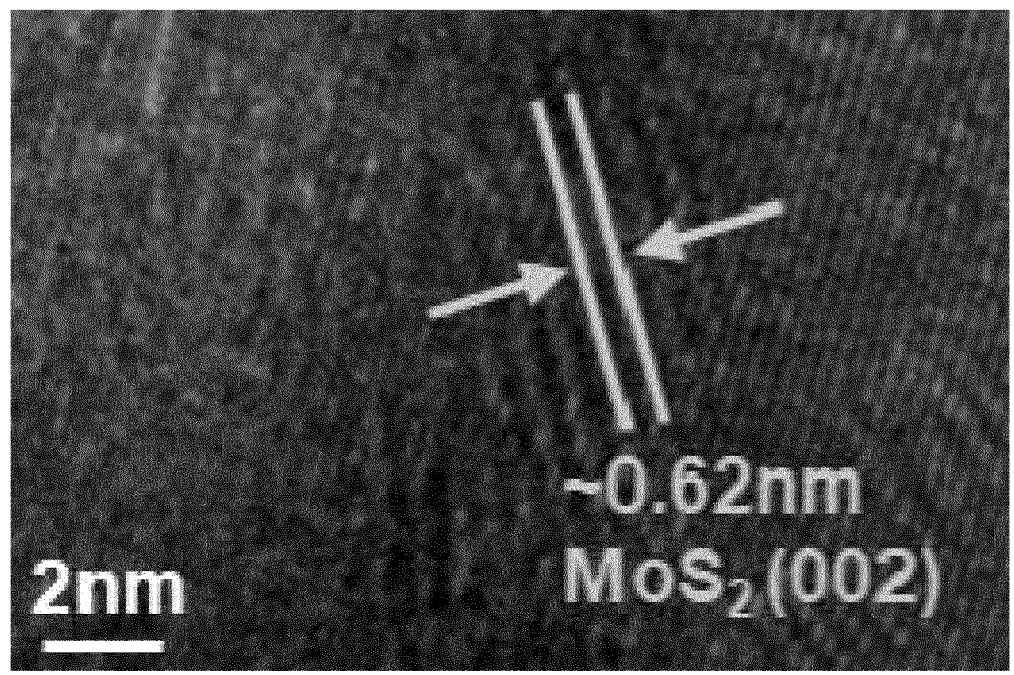
FIG. 3B shows another TEM image of the carbon nanotube composite catalytic film.
Figure 3C:
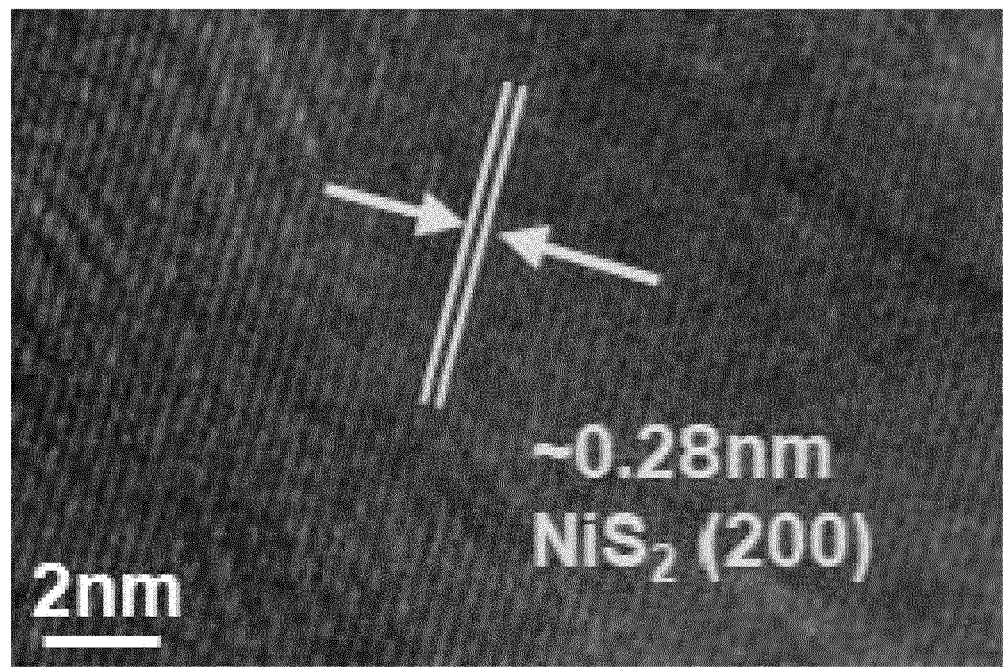
FIG. 3C shows yet another TEM image of the carbon nanotube composite catalytic film.
Figure 3D:
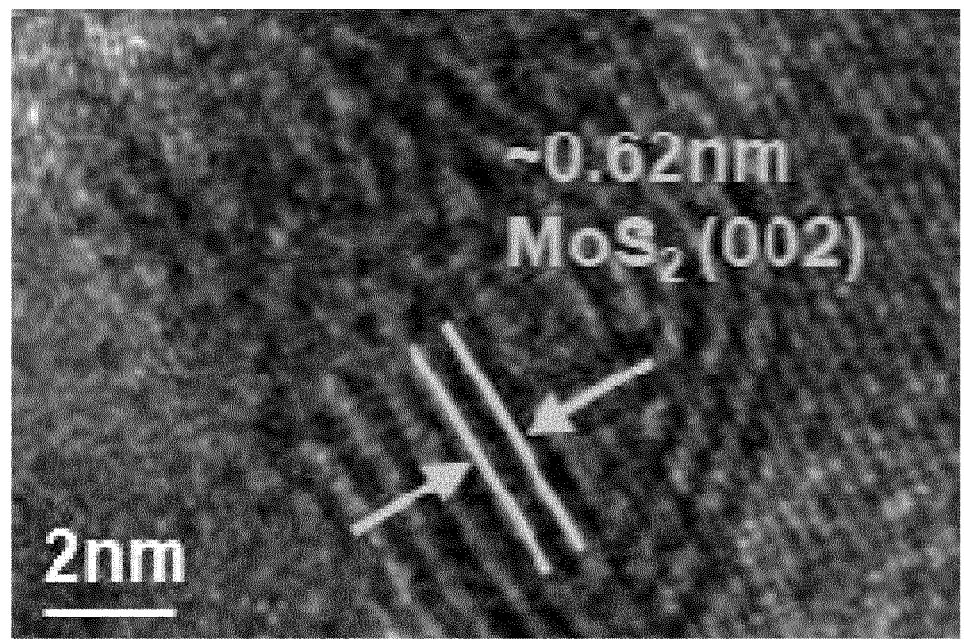
FIG. 3D shows yet another TEM image of the carbon nanotube composite catalytic film.
Figure 3E:
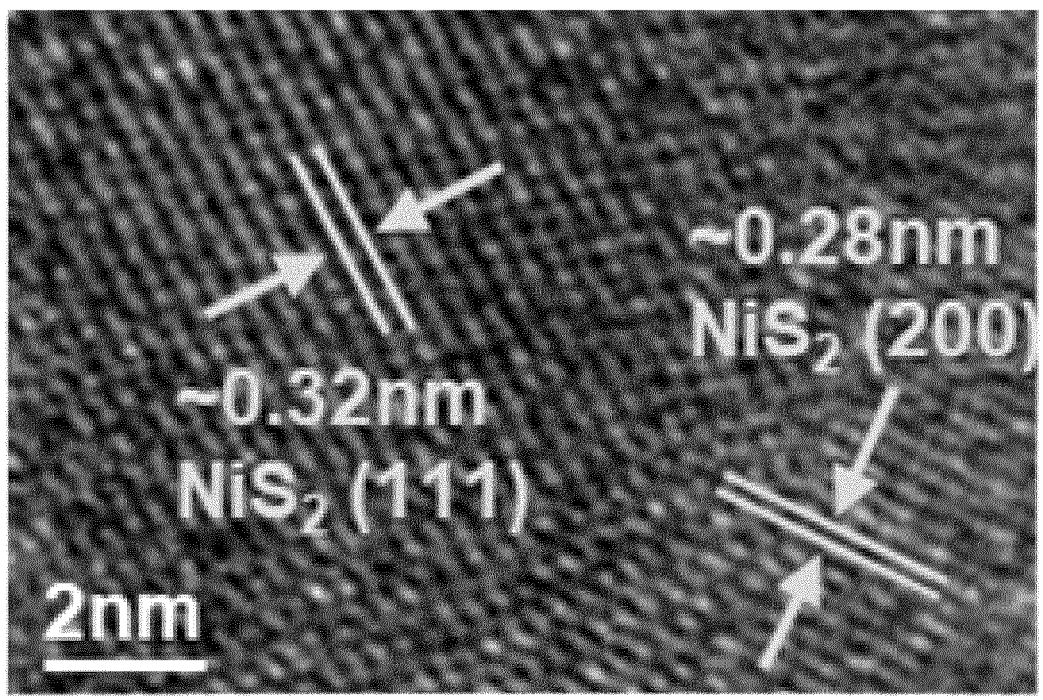
FIG. 3E shows yet another TEM image of the carbon nanotube composite catalytic film.
Figure 3F:
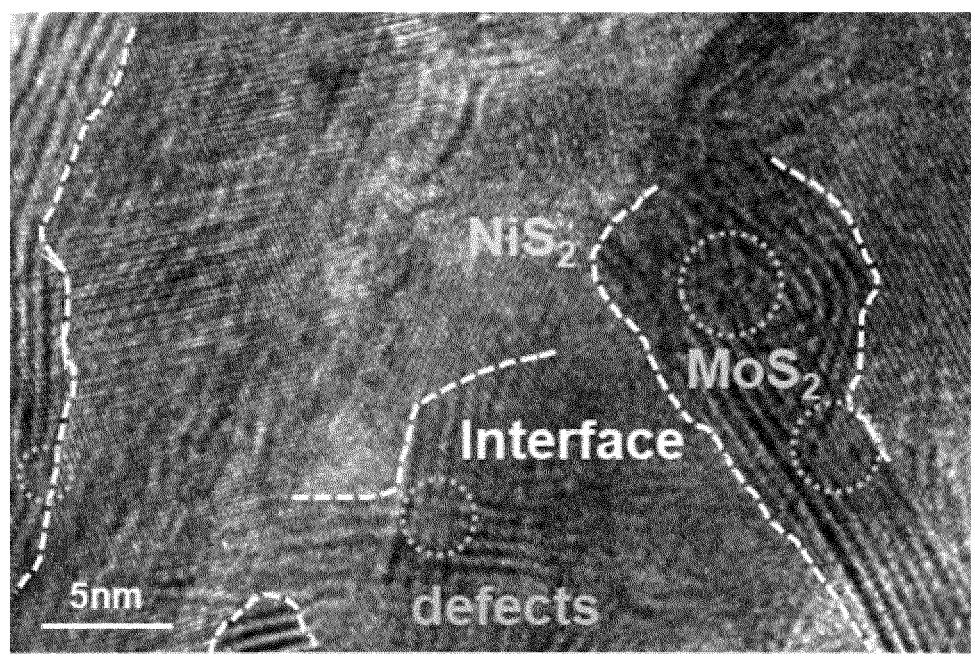
FIG. 3F shows yet another TEM image of the carbon nanotube composite catalytic film.

FIGS. 2A and 2B show scanning electron microscope images of the carbon nanotube composite catalytic film. As in FIGS. 2A and 2B, the surface roughness of the carbon nanotube composite catalytic film is large, and the periodic through holes with a diameter of 40 microns are obtained by laser drilling.

FIG. 3A-3F show transmission electron microscope images of the carbon nanotube composite catalytic film. Seen from FIG. 3A-3F, by measuring the interplanar spacing, it is proved that the main lattice of the carbon nanotube composite catalytic film is a carbon nanotube, $MoS_2$, and $NiS_2$. The carbon nanotube composite catalytic film has no Fe phase, indicating that Fe is mainly doped into the lattice of $MoS_2$ (molybdenum disulfide) and $NiS_2$ (nickel disulfide).

FIG. 4 shows an optical image of the carbon nanotube composite catalytic film. The black portion in FIG. 4 is the carbon nanotube composite catalytic film. Seen from FIG. 4, the carbon nanotube composite catalytic film has flexibility and free-standing properties.

Figure 5:
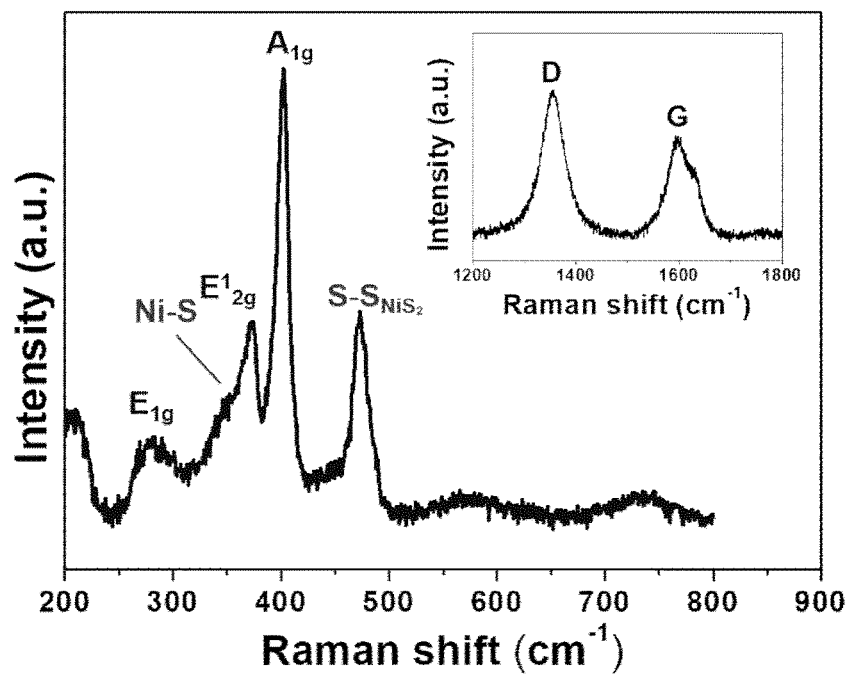
FIG. 5 shows a Raman spectrum of the carbon nanotube composite catalytic film.
Figure 6:
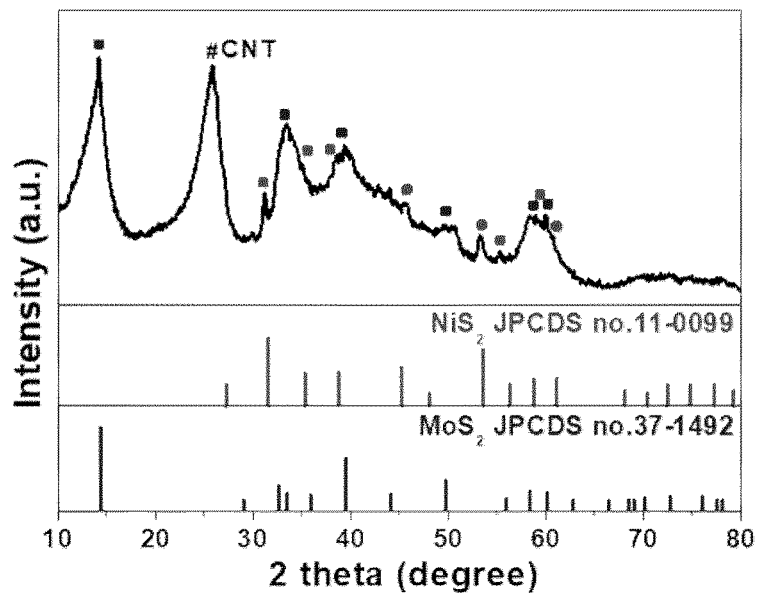
FIG. 6 shows an X-ray diffraction pattern of the carbon nanotube composite catalytic film.

FIG. 5 shows a Raman spectrum of the carbon nanotube composite catalytic film. FIG. 6 shows an X-ray diffraction pattern of the carbon nanotube composite catalytic film. Seen from FIGS. 5 and 6, the main components of the carbon nanotube composite catalytic film are carbon nanotube, $MoS_2$, and $NiS_2$.

Figure 7:
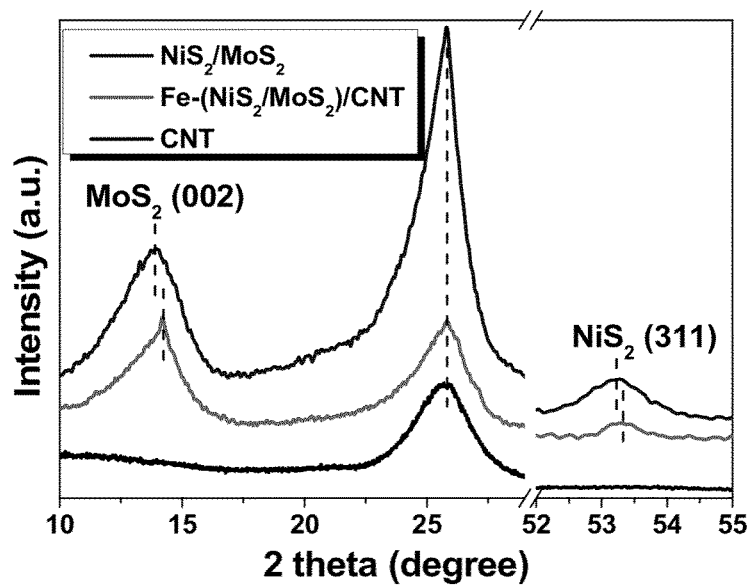
FIG. 7 shows another X-ray diffraction pattern of the carbon nanotube composite catalytic film.

FIG. 7 shows another X-ray diffraction pattern of the carbon nanotube composite catalytic film. Seen from FIG. 7, Fe is successfully doped into $MoS_2$ and $NiS_2$ in the carbon nanotube composite catalytic film.

Figure 8:
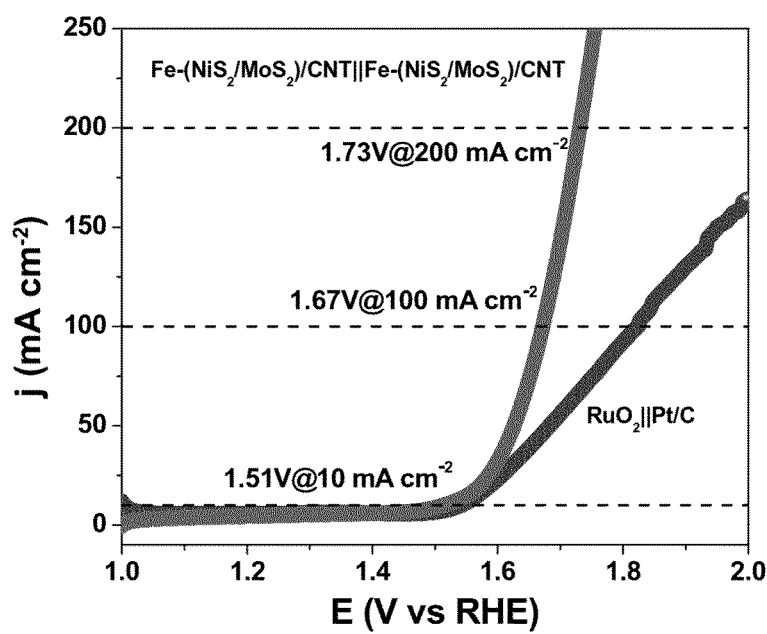
FIG. 8 shows voltage-current density curves obtained by catalytically electrolyzing water in 1 mol/L KOH solution, and a noble metal electrode pair and a catalytic electrode pair formed by the carbon nanotube composite catalytic film are used for catalytically electrolyzing water in the 1 mol/L KOH solution.

FIG. 8 shows voltage-current density curves obtained by catalytically electrolyzing water in 1 mol/L KOH solution, and a noble metal electrode pair and a catalytic electrode pair that is formed by the carbon nanotube composite catalytic film are used for catalytically electrolyzing water in the 1 mol/L KOH solution. Seen from FIG. 8, under the same voltage, the catalytic electrode pair can achieve a higher current density than the noble metal electrode pair. The catalytic electrode pair only needs 1.51 V when the current density is 10 mA cm$^{-2}$, while the noble metal electrode pair needs 1.54 V when the current density is 10 mA cm$^{-2}$. The noble metal electrode pair is formed by $RuO_2$ (ruthenium dioxide) and Pt/C (composite of platinum and carbon).

Figure 9:
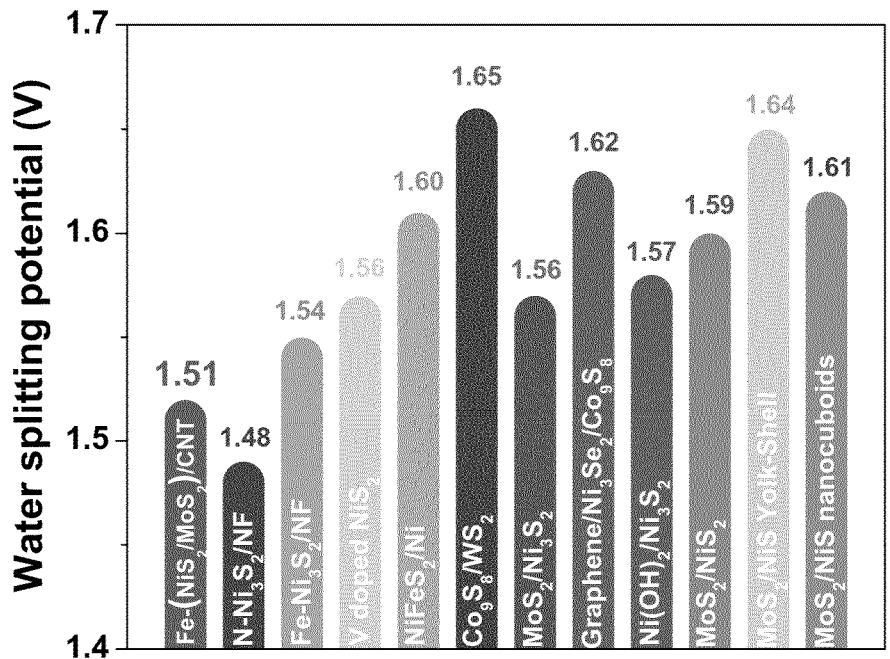
FIG. 9 shows a comparison diagram of a voltage required for the carbon nanotube composite catalytic film and voltages of other catalysts reported in the literature when a current density is 10 mA $cm^{-2}$.

FIG. 9 shows a comparison diagram of a voltage required for the carbon nanotube composite catalytic film and voltages of other catalysts reported in the literature when a current density is 10 mA cm$^{-2}$. Seen from FIG. 9, when the current density is 10 mA cm$^{-2}$, the voltage required for the carbon nanotube composite catalytic film is the smallest, and the voltage required for the carbon nanotube composite catalytic film is 1.5 V.

Figure 10:
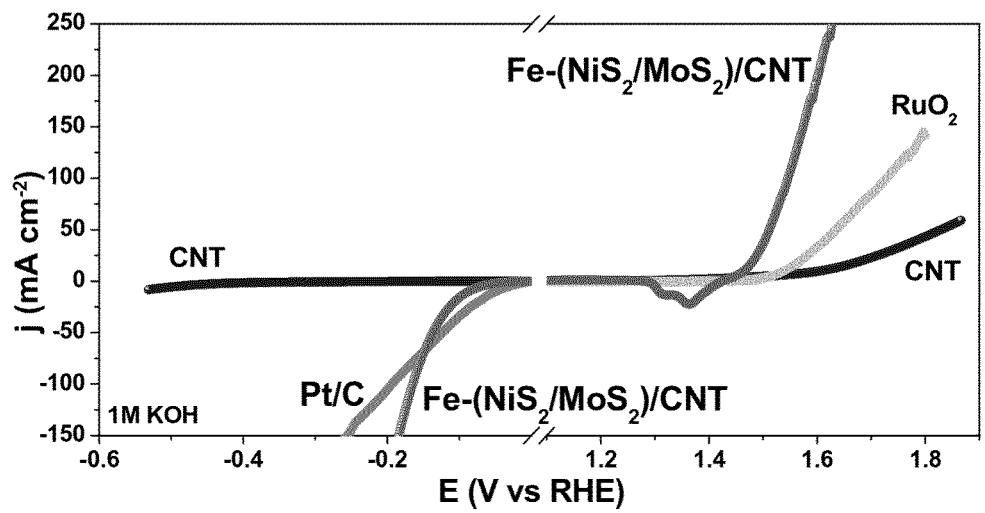
FIG. 10 shows voltage-current density curves of the hydrogen evolution reaction at the cathode and the oxygen evolution reaction at the anode of the carbon nanotube composite catalytic film, the noble metal catalyst and a pure carbon nanotube film in 1 mol/L KOH solution (PH=14).

FIG. 10 shows voltage-current density curves of the hydrogen evolution reaction at the cathode and the oxygen evolution reaction at the anode of the carbon nanotube composite catalytic film, the noble metal catalyst and a pure carbon nanotube film in 1 mol/L KOH solution (PH=14). Under the same voltage, the larger the absolute value of the current density, the better the catalytic performance. The negative current density represents the cathode current (reduction reaction). Seen from FIG. 10, the carbon nanotube composite catalytic film exhibits good catalytic performance for oxygen evolution and hydrogen evolution under alkaline conditions. Thus, the carbon nanotube composite catalytic film can be used as the catalyst of hydrogen evolution reaction and catalyst of oxygen evolution reaction in the alkaline environment.

Figure 11:
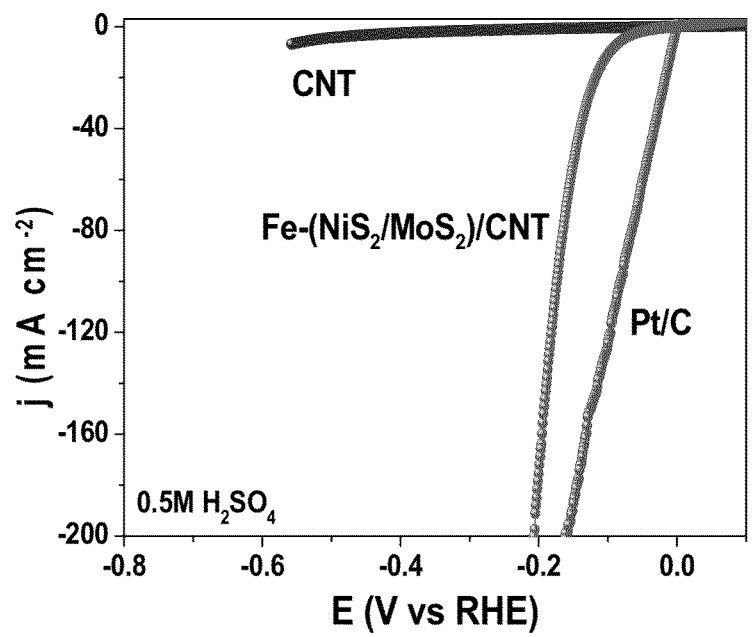
FIG. 11 shows voltage-current density curves of the hydrogen evolution reaction of the carbon nanotube composite catalytic film, the noble metal catalyst and the pure carbon nanotube film in 0.5 mol/L $H_2SO_4$ solution (PH=0).

FIG. 11 shows voltage-current density curves of the hydrogen evolution reaction of the carbon nanotube composite catalytic film, the noble metal catalyst and the pure carbon nanotube film in 0.5 mol/L $H_2SO_4$ solution (PH=0). Seen from FIG. 11, the carbon nanotube composite catalytic film exhibits good catalytic performance for hydrogen evolution under acidic conditions.

Figure 12:
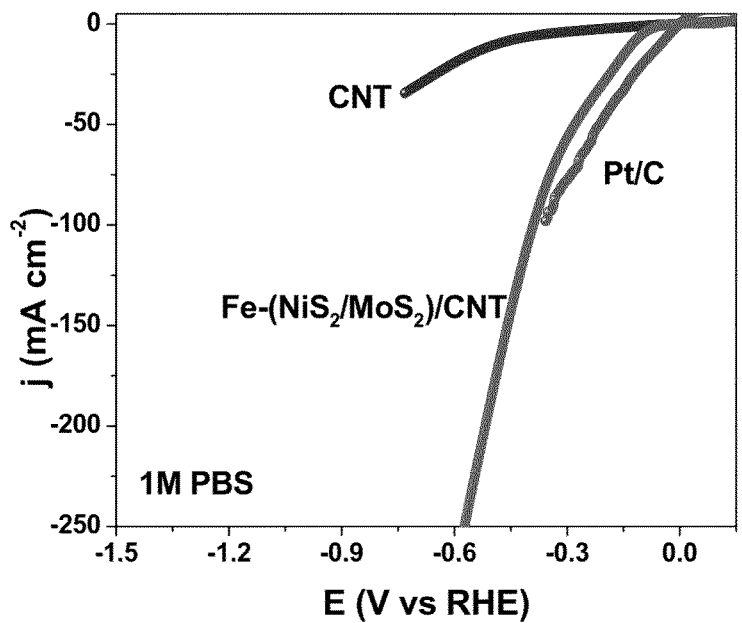
FIG. 12 shows voltage-current density curves of the hydrogen evolution reaction of the carbon nanotube composite catalytic film, the noble metal catalyst and the pure carbon nanotube film in 1 mol/L PBS (PH=7).

FIG. 12 shows voltage-current density curves of the hydrogen evolution reaction of the carbon nanotube composite catalytic film, the noble metal catalyst and the pure carbon nanotube film in 1 mol/L PBS (phosphate buffer saline, PH=7). Seen from FIG. 12, the carbon nanotube composite catalytic film exhibits good catalytic performance for hydrogen evolution under neutral conditions.

Figure 13:
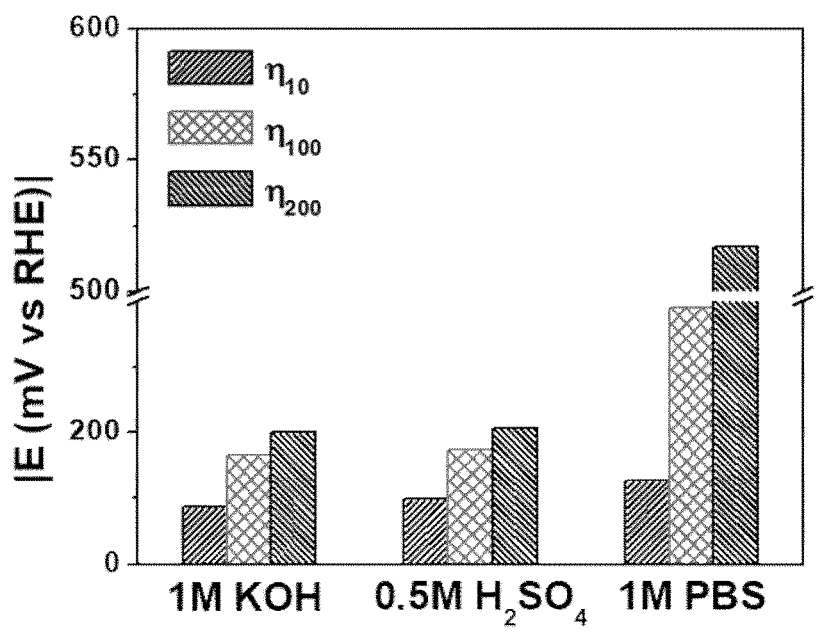
FIG. 13 shows voltages required for the carbon nanotube composite catalytic film to achieve the current density of 10, 100, 200 mA $cm^{-2}$ when the hydrogen evolution reaction occurs in different PH environments.

FIG. 13 shows voltages required for the carbon nanotube composite catalytic film to achieve the current density of 10, 100, 200 mA $cm^{-2}$ when the hydrogen evolution reaction occurs in different PH environments. Seen from FIG. 14, the carbon nanotube composite catalytic film has hydrogen evolution catalytic activity in a wide PH range.

Figure 14:
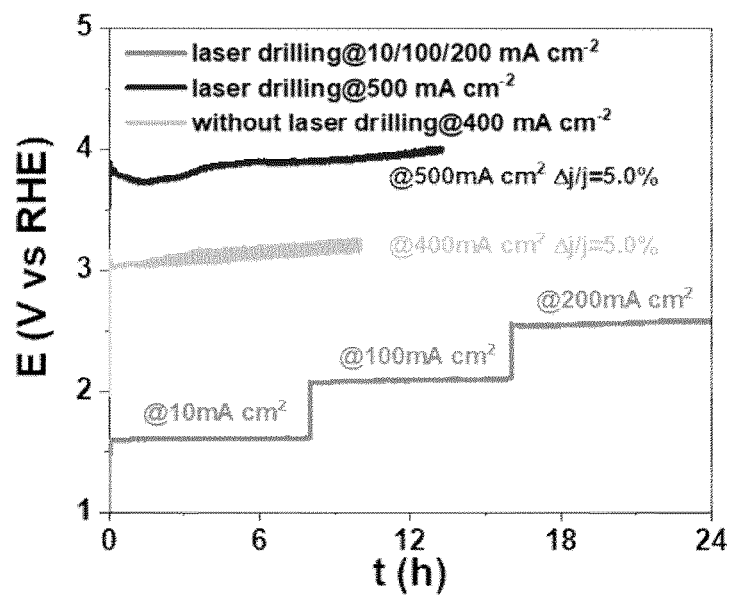
FIG. 14 shows a stability test image of electrolyzing water of the carbon nanotube composite catalytic film in the KOH solution.

FIG. 14 shows a stability test image of electrolyzing water of the carbon nanotube composite catalytic film in the KOH solution. In the FIG. 14, the bottom curve is the continuous test for 34 hours at three different current densities, and it is tested for 8 hours under each current density. The voltage is measured when the current density is unchanged, it can be found that electrolyzing water of the carbon nanotube composite catalytic film in KOH solution can remain stable under different current densities. The middle curve represents that the electrodes are not drilled by the laser. The top curve represents that the electrodes are drilled by the laser. Thus, the through holes drilling by the laser can improve the stability of the electrolyzing water of the carbon nanotube composite catalytic film in the KOH solution. After laser drilling, the performance will be attenuated by 5% after working for 13 hours at the current density with 500 mA $cm^{-2}$. However, when the laser drilling is not performed, the performance will be attenuated by 5% after working for 10 hours at the current density with 400 mA $cm^{-2}$. Thus, the carbon nanotube composite catalytic film has good electrolysis stability.

Figure 15:
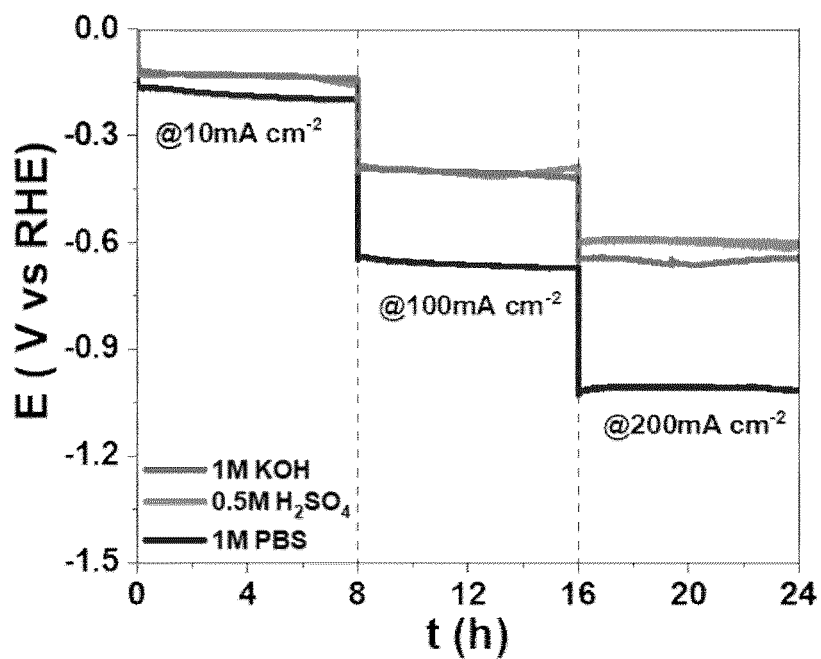
FIG. 15 shows a stability test image of hydrogen evolution catalysis of the carbon nanotube composite catalytic film in different PH environments.

FIG. 15 shows a stability test image of hydrogen evolution catalysis of the carbon nanotube composite catalytic film in different PH environments. In FIG. 15, the stability of hydrogen evolution catalysis of the carbon nanotube composite catalytic film is continuously tested for 24 hours under different current densities. Seen from FIG. 15, the overall stability of the carbon nanotube composite catalytic film is still very high, and there is no obvious performance attenuation.

Figure 16:
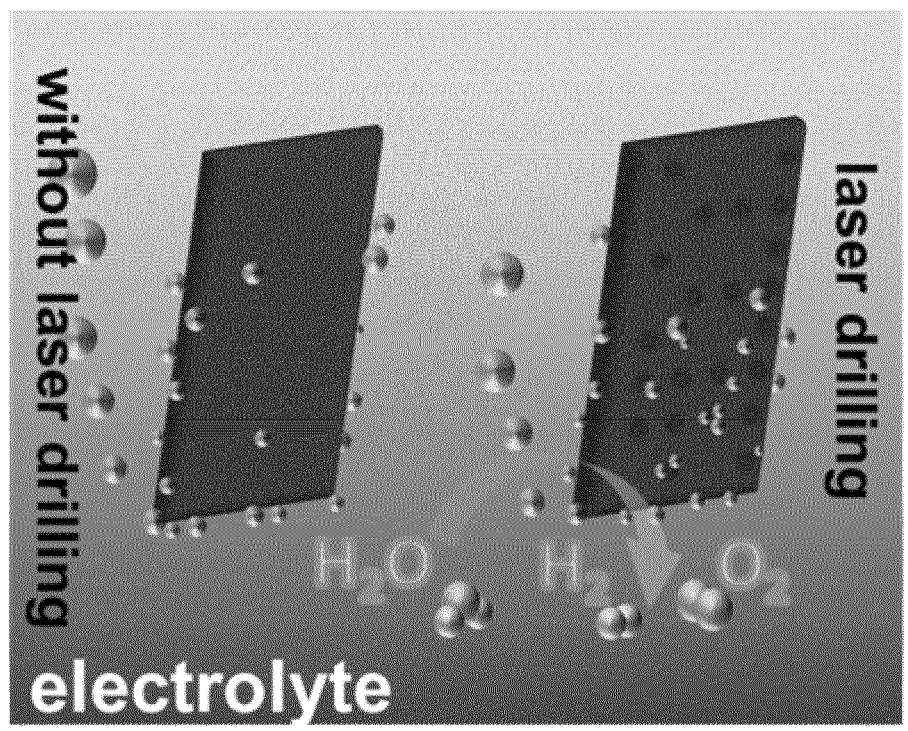
FIG. 16 shows a schematic view of bubbles overflow of the carbon nanotube composite catalytic film (laser drilling in the method) and a carbon nanotube composite film (not laser drilling in the method).

FIG. 16 shows a schematic view of bubbles overflow of the carbon nanotube composite catalytic film (laser drilling in the method) and a carbon nanotube composite film (not laser drilling in the method). The bubbles are mainly released through the edge position. Drilling can provide more edge positions, increase the way of bubble release, and weaken the damage to the electrode by mechanical force during the bubble release process, thereby improving the stability of the carbon nanotube composite catalytic film during electrolyzing.

The carbon nanotube composite catalytic film and the method for making the carbon nanotube composite catalytic film have the following advantages: first, the carbon nanotube composite catalytic film is formed by combining the Fe-doped ($NiS_2/MoS_2$) composite and the carbon nanotube film, and then drilling by the laser, thus the carbon nanotube composite catalytic film has good catalytic performance; second, the carbon nanotube composite catalytic film does not contain noble metals, thus the carbon nanotube composite catalytic film has a low cost and a wide range of sources; third, in the alkaline environment, the carbon nanotube composite catalytic film can be used as the catalyst for hydrogen evolution reaction and oxygen evolution reaction; fourth, in the alkaline environment, the electrolysis water reaction of the carbon nanotube composite catalytic film can reach a current density greater than that of the noble metal electrode; fifth, the voltage of the electrolysis water reaction of the carbon nanotube composite catalytic film only needs 1.51 V when the current density is 10 mA $cm^{-2}$; sixth, the carbon nanotube composite catalytic film can be used as the catalyst for hydrogen evolution reaction in the neutral or acidic environment; seventh, the carbon nanotube composite catalytic film defines multiple through holes, it is beneficial to release the hydrogen and oxygen bubbles generated on the electrode, thus the carbon nanotube composite catalytic film has good stability.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Additionally, it is also to be understood that the above description and the claims drawn to a method may comprise some indication in reference to certain steps. However, the indication used is only to be viewed for identification purposes and not as a suggestion as to an order for the steps.

What is claimed is:

1. A method for making a carbon nanotube composite catalytic film, comprising:
   providing a carbon nanotube film;
   providing a precursor solution comprising iron nitrate, nickel chloride, and molybdenum pentachloride;
   placing the precursor solution on the carbon nanotube film and drying, to obtain a precursor film;
   making the precursor film define a plurality of through holes spaced apart from each other; and
   annealing the precursor film with the plurality of through holes, and applying a sulfur powder during annealing the precursor film with the plurality of through holes.

2. The method of claim 1, wherein the precursor solution consists of the iron nitrate, the nickel chloride, the molybdenum pentachloride, and the solvent.

3. The method of claim 1, wherein making the precursor film define a plurality of through holes comprises drilling the precursor film by a laser.

4. The method of claim 1, wherein annealing the precursor film with the plurality of through holes is performed in a protective gas.

5. The method of claim 4, wherein the protective gas is a mixture of 90% Ar and 10% $H_2$.

6. The method of claim 1, wherein annealing the precursor film with the plurality of through holes is performed in a mixture of 90% Ar and 10% $H_2$ at 400° C. for 30 minutes.

7. The method of claim 1, wherein a method for making the carbon nanotube film comprising:
   providing carbon nanotubes;
   adding the carbon nanotubes into a solvent and flocculating, to obtain a carbon nanotube floccule structure; and
   separating the carbon nanotube floccule structure from the solvent and drying.

8. A carbon nanotube composite catalytic film, comprising:
   a carbon nanotube film comprising a plurality of carbon nanotubes; and
   a plurality of Fe-doped ($NiS_2$/$MoS_2$) composites comprising $NiS_2$, $MoS_2$, and Fe, wherein the plurality of Fe-doped ($NiS_2$/$MoS_2$) composites are located on the carbon nanotube film, and the carbon nanotube composite catalytic film defines a plurality of through holes.

9. The carbon nanotube composite catalytic film of claim 8, wherein a diameter of each of the plurality of through hole ranges from approximately 30 microns to approximately 50 microns, and a distance between adjacent two through holes ranges from approximately 100 microns to approximately 1600 microns.

10. The carbon nanotube composite catalytic film of claim 8, wherein a molar ratio of Fe element, Ni element, and Mo element is 1:18:36.

* * * * *